J. DOLLARD.
Method of Lining Bored Wells.
No. 202,796. Patented April 23, 1878.
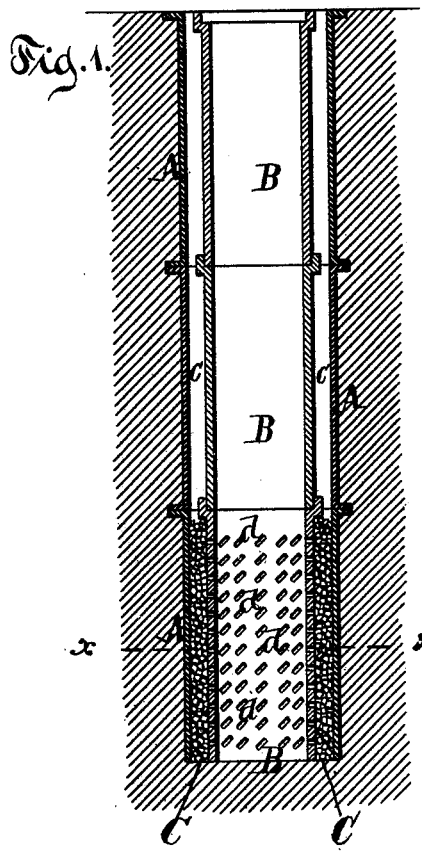
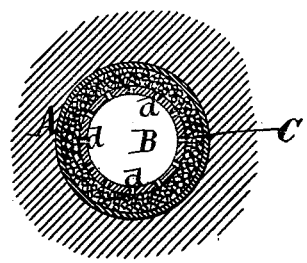
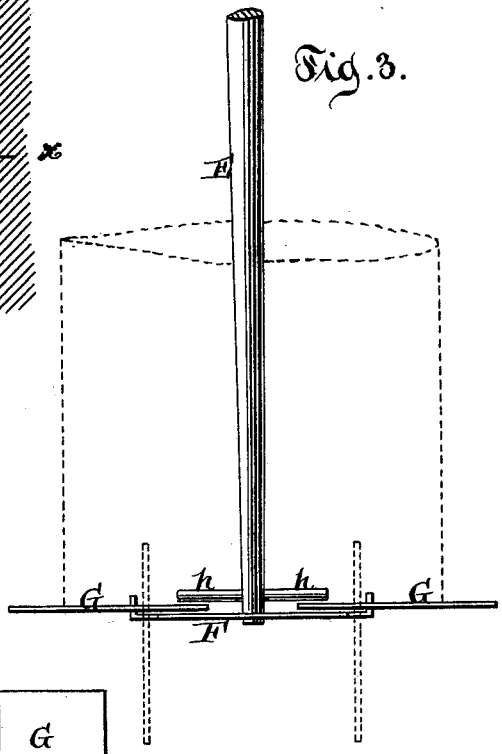
Witnesses.
Chas. Wahlers.
H. Brueggemann
Inventor
James Dollard
pr Van Santvoord & Hauff
attys.

UNITED STATES PATENT OFFICE.

JAMES DOLLARD, OF BABYLON, NEW YORK.

IMPROVEMENT IN METHODS OF LINING BORED WELLS.

Specification forming part of Letters Patent No. 202,796, dated April 23, 1878; application filed March 20, 1878.

*To all whom it may concern:*

Be it known that I, JAMES DOLLARD, of Babylon, in the county of Suffolk and State of New York, have invented a new and useful Improved Method of Lining Bored Wells, which invention is fully set forth in the following specification, reference being had to accompanying drawing, in which—

Figure 1 is a vertical section of a well, showing my invention. Fig. 2 is a horizontal section in the line $x\,x$, Fig. 1. Fig. 3 is a side elevation of an implement which I use in carrying out my invention. Fig. 4 is a plan view thereof.

Similar letters indicate corresponding parts.

The usual method of lining a bored well consists in introducing therein a galvanized-iron pipe, constructed in sections, which are placed one over the other as the boring operation is proceeded with. This pipe, however, is liable to rust after a certain length of time, and is therefore objectionable. To overcome this objection I use a pipe made of fire-clay; and to permit of introducing a pipe of this nature without danger of breakage is the chief aim of my invention.

It consists in the method of lining a bored well by first introducing therein a temporary pipe, of iron or other similar material, then introducing a clay pipe, the lower part of which is perforated, then introducing a sufficient quantity of gravel or other similar substance to form a porous jacket around the perforated portion of the clay pipe, and finally removing the temporary pipe, whereby I am enabled to place the clay pipe in position with ease and facility.

In carrying out my invention, I bore the well in the usual way, and, as the boring operation is proceeded with, successively introduce the sections A of an iron or other pipe of like nature, to form a temporary wall, until the desired depth has been reached, the sections being connected together in any suitable way. I then introduce a clay pipe, B, in a similar manner to the pipe A, this clay pipe being also made in sections, which are connected together in the usual way of connecting the sections of this class of pipe. The lower section, or the clay pipe B, has perforations $d$ in its side part, and this pipe is made of such diameter as to leave an annular space, C, between the exterior or temporary pipe A and the clay pipe. Into this space I introduce a sufficient quantity of gravel or other similar substance to form a porous jacket around the perforated portion of the clay pipe B, which jacket permits the water or other liquid to be drawn to reach the perforations $d$, and at the same time prevents their becoming clogged up. After the gravel has been introduced I remove the temporary pipe A, when the well is ready for use.

By perforating the side part of the pipe B, in contradistinction to the bottom thereof, the water or other liquid to be drawn is caused to find its way to the well with the greatest possible facility, and hence a very rapid influx thereof is produced.

In introducing the pipe B, I make use of an implement such as represented in Figs. 3 and 4, and which is constructed of a rotating handle, E, carrying a transverse plate, F, to the opposite ends of which are hinged two wings, G G, in such a manner that these wings have a tendency to occupy a position at right angles to the transverse plate F, or parallel to the handle E, as shown in dotted outline in Fig. 3, but which can be held in a plane parallel to the plate E by means of pins $h$, projecting from the handles E a short distance above the plate.

The wings G G are adjusted to the position last stated, and the section of the pipe to be lowered is allowed to rest on the outer portions of the wings. The whole is then lowered, and when the spot at which it is desired to deposit the pipe has been reached the handle E is rotated, whereby the retaining-pins $h$ are disengaged from the wings G G, and the latter are released, when they assume a vertical position, and thus release the pipe, besides permitting of withdrawing the implement.

The porous jacket formed around the perforated portion of the clay pipe has the effect of preventing sand from getting into the well, besides keeping the perforations open, as before stated. If desired, a quantity of gravel can also be placed inside of the well.

What I claim as new, and desire to secure by Letters Patent, is—

The method of lining a bored well with frangible tubing by first introducing therein a temporary pipe, of iron or like material, then inserting the perforated frangible tube, and filling the space between it and the temporary tube with gravel or equivalent substance to form a porous jacket around the perforated portion of said frangible tube, and finally removing the temporary pipe, substantially as explained.

In testimony that I claim the foregoing I have hereunto set my hand and seal this 11th day of March, 1878.

JAMES DOLLARD. [L. S.]

Witnesses:
　WILLIAM ENNIS,
　W. HAUFF.